United States Patent [19]
Yokoyama

[11] Patent Number: 5,134,549
[45] Date of Patent: Jul. 28, 1992

[54] SURFACE LIGHT SOURCE DEVICE

[75] Inventor: Kazuaki Yokoyama, Saitama, Japan

[73] Assignee: Enplas Corporation, Kawaguchi, Japan

[21] Appl. No.: 666,901

[22] Filed: Mar. 11, 1991

[30] Foreign Application Priority Data

| Jun. 19, 1990 | [JP] | Japan | 2-63982[U] |
| Jun. 19, 1990 | [JP] | Japan | 2-63983[U] |
| Aug. 2, 1990 | [JP] | Japan | 2-81739[U] |

[51] Int. Cl.$^5$ .............................. F21V 8/00
[52] U.S. Cl. ........................ 362/31; 362/223
[58] Field of Search ............ 362/26, 31, 32, 307, 362/223

[56] References Cited

U.S. PATENT DOCUMENTS

| 2,347,665 | 5/1944 | Christensen et al. | 362/31 |
| 4,779,166 | 10/1988 | Tanaka et al. | 362/31 |
| 4,811,507 | 3/1989 | Bianghet | 362/31 |
| 4,860,171 | 8/1989 | Kojima | 362/31 |
| 4,937,709 | 6/1990 | Yanagi et al. | 362/31 |
| 4,965,950 | 10/1990 | Yamada | 362/31 |

FOREIGN PATENT DOCUMENTS

| 59-8809 | 2/1984 | Japan . | |
| 61-34188 | 3/1986 | Japan . | |
| 61-133502 | 6/1986 | Japan . | |
| 536887 | 5/1941 | United Kingdom | 362/31 |
| 664193 | 1/1952 | United Kingdom | 362/31 |

Primary Examiner—Ira S. Lazarus
Assistant Examiner—Richard R. Cole
Attorney, Agent, or Firm—Cushman, Darby & Cushman

[57] ABSTRACT

A surface light source device comprising a linear light source, a light transmitting member having an end surface of incidence located in the vicinity of the light source, a diffusing plate arranged on the front surface of the light transmitting member and a reflecting plate arranged on the rear surface of the light transmitting member; pattens formed as portions having diffusing functions being arranged on the rear surface of the light transmitting member, and the portions having the diffusing function being sparse in area in the vicinity of the center of the end surface of incidence and becoming denser as the portions are farther from the end surface of incidence. The surface light source device is adapted so as to uniformalize luminance on the diffusing plate.

7 Claims, 4 Drawing Sheets

SURFACE LIGHT SOURCE DEVICE

BACKGROUND OF THE INVENTION (a) Field of the Invention

The present invention relates to a surface light source device which is to be used as a back light for liquid crystal display units, etc., and more specifically to a surface light source device which uses a light transmitting member.

(b) Description of the Prior Art

The conventional surface light source device using a light guide consists, as shown in FIG. 1, of a light source 1, a light transmitting member 2 having an end surface 2a located in the vicinity of said light source, a diffusing plate 3 arranged on the front surface of the light transmitting member 2 and a reflecting surface arranged on the rear surface of the light transmitting member 2. This conventional surface light source device is adapted in such a manner that the light emitted from the light source 1 enters into the light transmitting member 2 through the end surface 2a thereof and sequentially transmitted to the other end surface 2b while being sequentially reflected by the front surface and the rear surface (reflecting surface). During the transmission, fractions of the light are scattered by the diffusing plate 3 and emerge as diffused light out of the diffusing surface 3. Since the diffusing plate 3 diffuses the light as described above, it allows the diffused light to emerge therefrom at a nearly constant luminance and is usable as a surface light source.

Such a surface light source device using a light transmitting member allows amount of light to be reduced as the portions of the diffusing plate are farther from the light source since the light is attenuated progressively as it travels through the light transmitting member. Accordingly, luminance on the front surface of the light transmitting member (the diffusing plate) is higher at the portions nearer the light source and lower at the portions farther from the light source.

As the conventional surface light source devices which have corrected the defect described above, there are known the surface light source devices using the linear patterns printed in milky white ink, paint or the similar material on the reflecting surfaces as shown in FIG. 2 and FIG. 3. For example, these patterns are formed as mesh-like patterns or parallel lines, as shown in FIG. 2 or FIG. 3, which are traced at narrow intervals on the side nearer the light source and at wider intervals toward the side farther from the light source so as to uniformalize luminance on the diffusing surface.

The conventional surface light source devices using the patterns traced on the reflecting surface of the light transmitting member or the reflecting plate cannot exhibit sufficient diffusing function and are insufficient in the effect to uniformalize luminance since these surface light source devices use linear patterns.

As another conventional surface light source device which has corrected this defect, there is known the surface light source device which is adapted so as to uniformalize luminance of the diffused light emerging from the diffusing plate 3, for example, by printing patterns in milky white ink or paint on the light transmitting member 2 so that the patterns are sparse in are in the vicinity of the end surface of incidence 2a and are dense in area as they are farther from the end surface of incidence 2a as illustrated in FIG. 4.

As a further example of the conventional surface light source device, there is known the surface light source device which is adapted so as to increase amount of light by forming a second reflecting surface 5 on the end surface 2b located on the side opposite to the end surface of incidence 2a of the light guide, as shown in FIG. 5, so that the light having transmitted through the light transmitting member 2 and having reached the end surface 2b is reflected by the reflecting surface 5 and returns to the light guide 2.

The conventional example of this type also adopts, for uniformalizing the diffused light, patterns 6 which are formed by printing milky white ink or paint so as to have a diffusing function, and be at low density in area on the side of the end surface of incidence 2a and at high density in area on the side of the other end surface 2b as shown in FIG. 6.

The conventional surface light source device illustrated in FIG. 5 and FIG. 6 provides diffused light at luminance shown in FIG. 7. That is to say, this surface light source device has a constant luminance distribution from the end surface of incidence (at length zero) toward the other end surface (at length l), but enhances luminance at the portions close to the other end surface (the second reflecting surface 5) and has a defect that luminance cannot be said uniform at all the portions of the diffusing surface.

In order to correct this defect, there has been proposed the surface light source device which adopts the patterns illustrated in FIG. 8. The patterns of this conventional example are formed as dots having diameters which are small on the side of the end surface of incidence 2a, progressively larger as the portions of the reflecting surface are farther from the end surface of incidence 2a and smaller again in the vicinity of the other end surface (the second reflecting surface). In other words, the patterns 6 are arranged so that the density in area thereof is changed progressively from high to low from the end surface of incidence and then is changed from high to low again in the vicinity of the second reflecting surface. Accordingly, the diffused light emerging from the diffusing surface has a nearly uniform luminance distribution over the entire range from the end surface of incidence to the second reflecting surface.

This conventional surface light source device can provide diffused light uniform in luminance on the diffusing plate perpendicular to the light source 1. However, since it is sometimes necessary to equalize the length of the end surface of incidence 2a to the total length of the light source 1 due to restriction imposed on space, the conventional surface light source device has a defect in such a case that it allows luminance to be lowered at the portions of the diffusing plate close to both the ends of the end surface of incidence 2a under the influence produced by the electrodes attached to both the ends of the light source 1 (in the vicinity of the spots indicated by the reference symbol A).

SUMMARY OF THE INVENTION

A primary object of the present invention is to provide a surface light source device which comprises a light source, a light transmitting member having an end surface of incidence located in the vicinity of the light source, a diffusing plate arranged on the front surface of the light transmitting member, a reflecting plate arranged on the rear surface of the light transmitting member, and belt-shaped patterns which have a diffusing function and are arranged at a definite pitch on the reflecting surface of the light transmitting member or the reflecting plate, density in area of said patterns arranged on the light transmitting member or said reflecting plate being high on the side of the end surface of incidence, becoming lower toward the side opposite to the end surface of incidence and high in the vicinity of both the ends of the end surface of incidence.

Another object of the present invention is to provide a surface light source device wherein density in area of said patterns arranged on the light transmitting member or the reflecting plate is low in the vicinity of the middle portion of the end surface of incidence and becomes lower at the portions farther from said middle portion.

DETAILED DESCRIPTION OF THE PREFERRED EMBODIMENTS

Now, the present invention will be described more detailedly below with reference to the Embodiments thereof illustrated in the accompanying drawings.

Figure 1:
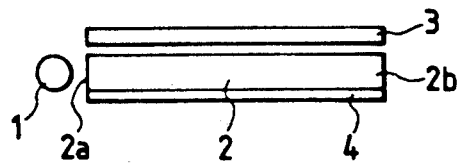
FIG. 1 shows a sectional view illustrating an example of the conventional surface light source devices.
Figure 2:
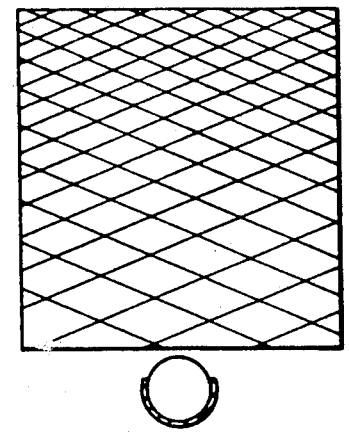
FIG. 2 through FIG. 4 show top views illustrating the patterns used in the example of the conventional surface light source devices.
Figure 3:
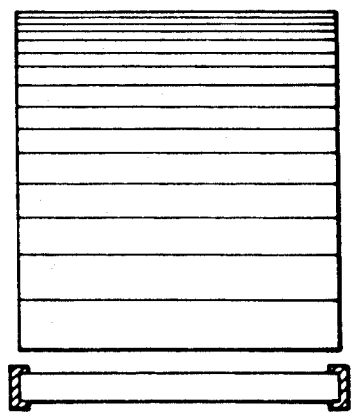
Figure 10:
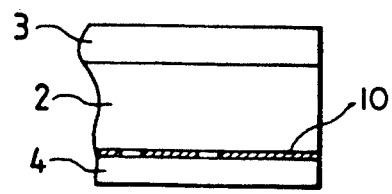
FIG. 10 shows a sectional view illustrating portions of the Embodiment 1 of the present invention at an expanded scale.
Figure 11:
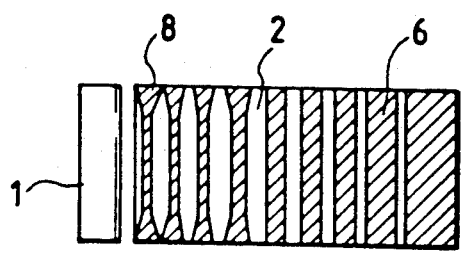
FIG. 11 shows a top view illustrating patterns used in the Embodiment 1 of the present invention.

The Embodiment 9 of the present invention is illustrated in FIG. 1, wherein the reference symbol 1 represents a light source such as a cold cathode ray tube, the reference symbol 2 designates a light transmitting member, the reference symbol 3 denotes a diffusing plate and the reference symbol 4 represents a reflecting plate, these members being substantially the same as those used in the conventional surface light source devices. An assembly consisting of the light transmitting member, the diffusing plate and the reflecting plate is partially illustrated in FIG. 10 wherein an irregularly coarse surface or a layer of milky white ink or paint 5 forming patterns as shown in FIG. 11 is formed between the light transmitting member 2 and the reflecting plate 4. This irregularly coarse surface or the milky white layer 5 consists, for example, of linear patterns having certain widths which are wider as the pattens are farther from the light source 1 when they are arranged at a constant pitch.

Since the patterns of the irregularly coarse surface or the milky white layer have the widths or areas which are larger as they are farther from the light source, light is diffused at higher degrees as the portions of the diffusing plate are farther from the light source so to uniformalize brightness on the diffusing surface 3. Moreover, since the patterns of the coarse surface or the milky white are small and have definite areas, the diffusing function is obtained without fail.

Further, in the section located in the vicinity of the end surface of incidence, the patterns 6 have widths progressively larger toward the electrodes of the light source. Accordingly, it is possible to increase amount of light in the vicinity of both the ends of the end surface of incidence wherein amount of light would otherwise be insufficient or uniformalize luminance distribution over the entire surface of the diffusing plate.

The patterns mentioned above can be manufactured by printing an ink containing white additive, a paint containing glass beads or a white paint as well as injection molding with a die embossed by sandblasting or compression molding.

In addition, the patterns may have any shape so far as they have narrow widths and areas narrower as they are farther from the light source.

Figure 4:
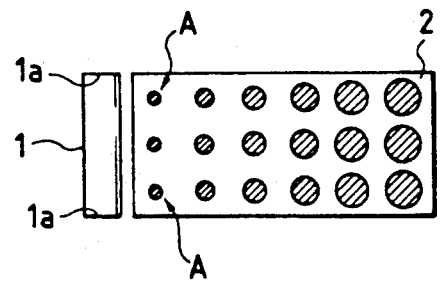
Figure 5:
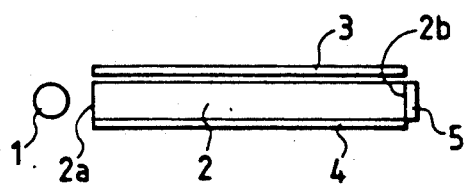
FIG. 5 and FIG. 6 show diagrams illustrating another example of the conventional surface light source devices.
Figure 6:
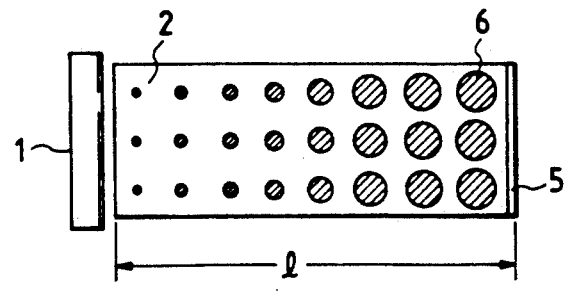
Figure 7:
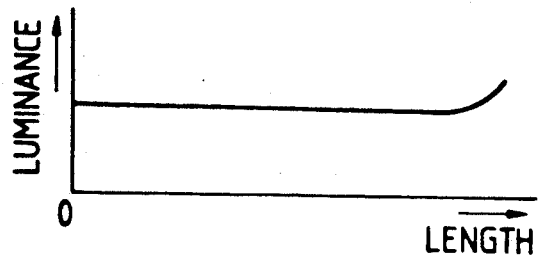
FIG. 7 shows a graph illustrating luminance distribution in the conventional surface light source device shown in FIG. 5 and FIG. 6.
Figure 8:
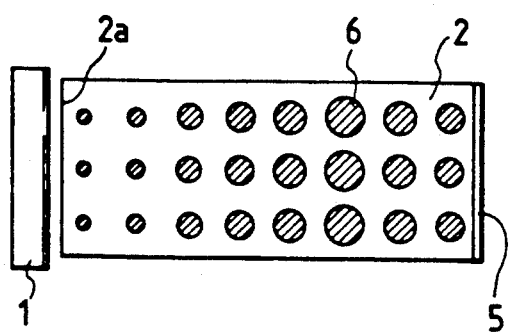
FIG. 8 shows a top view illustrating patterns used in a further example of the conventional surface light source devices.
Figure 9:
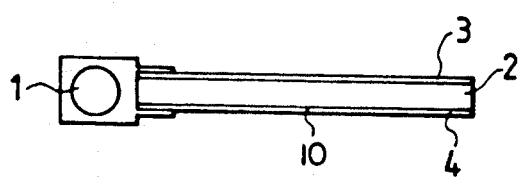
FIG. 9 shows a sectional view illustrating composition of Embodiment 1 of the surface light source device according to the present invention.
Figure 12:
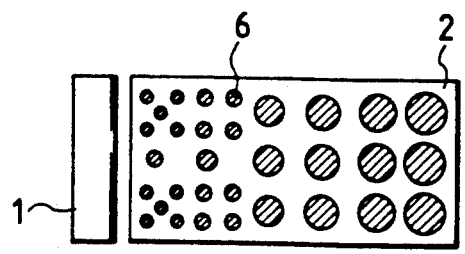
FIG. 12 through FIG. 15 show top views illustrating patterns used in Embodiments 2 through 6 respectively of the present invention.

FIG. 12 shows patterns formed on the light transmitting member adopted for the Embodiment 2 of the present invention. The printed patterns used in the Embodiment 2 are similar to the patterns adopted in the conventional example shown in FIG. 4 which are enlarged or denser in area from the middle portion of the light transmitting member toward the side farther from the light source. In the vicinity of the end surface of incidence, however, the patterns 6 are denser at the portions close to the electrodes of the light source. Accordingly, the Embodiment 2 of the present invention can uniformalize luminance not only as a whole but also at the portions close to both the ends of the end surface of incidence, for which the conventional example cannot provide sufficient amount of light, thereby uniformalizing luminance distribution over the entire range of the diffusing plate without enlarging the surface light source device.

Figure 13:
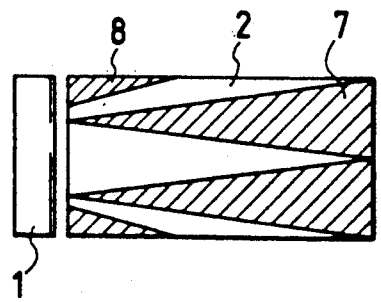

FIG. 13 shows patterns adopted for the Embodiment 3 of the present invention. This embodiment adopts triangular patterns 7 which are narrower on the side closer to the end surface of incidence and wider on the side farther from said end surface as well as triangular milky white printed patterns 8 on both the sides in the vicinity of the end surface of incidence. Accordingly, density in area of the patterns is low on the side of the end surface of incidence and higher at the portions farther from the end surface of incidence. Further, the triangular patterns 8 arranged at the portions close to the electrodes of the linear light source enhacne luminance at said portions, at which luminance is lowered by the conventional examples, thereby uniformalizing luminance over the entire range of the diffusing plate.

Figure 14:
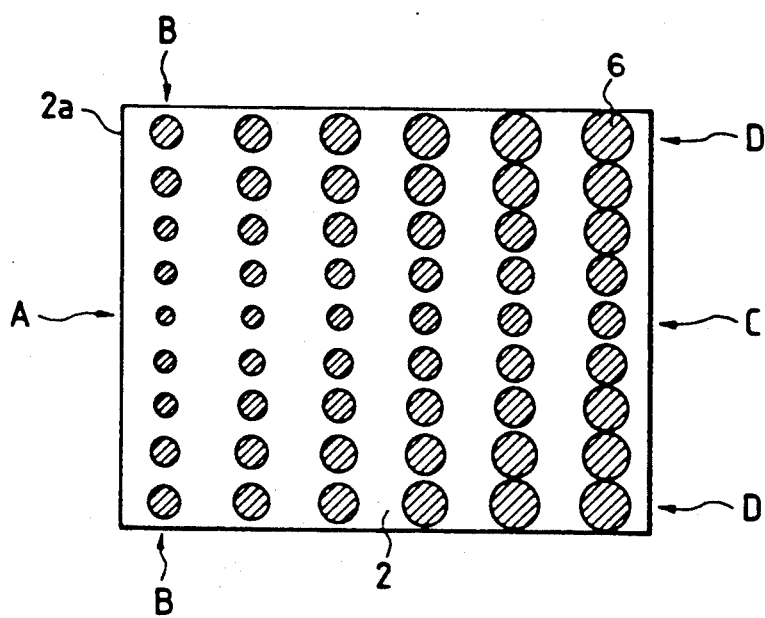

FIG. 14 illustrates patterns formed on the light transmitting member adopted for the Embodiment 4 of the present invention. In this embodiment, the diffusing pattern formed in a shape of a spot at the portion indicated by the reference symbol A, i.e., in the vicinity of the end surface of incidence of the light transmitting member, has the smallest area, and the patterns have areas which are larger toward the portions located at both the ends indicated by the reference symbols B. Further, areas of the patterns are enlarged from the portion A toward the portion indicated by the reference symbol C. Furthermore, areas of the patterns are also enlarged from the portion C toward the portions indicated by the reference symbols D. That is to say, the spot formed at the portion A in the vicinity of the middle of the end surface of incidence has the smallest area, and the patterns have larger areas as they are farther from the portion A in any direction and the largest areas at the portions D.

Density in area of the patterns used in the Embodiment 4 is low at the portion A in the vicinity of the middle of the end surface of incidence 2a and becomes higher at the portions farther from the middle of the end surface of incidence 2a. Density in area is the highest at the portions D which are the farthest from the portion A.

The Embodiment 4 which uses the patterns described above allows, at the portion A at which light is incident in a large amount, light to be transmitted at a high ratio by the total reflection due to low diffusion of light by the patterns so as to suppress the emergence of light from the portion of the diffusing plate located in the vicinity of the portion A, and enhances the diffusing function of the patterns at the portions farther from the portions A so as to increase the emergence of light from the portions of the diffusing plate located farther from the portion A, thereby uniformalizing amount of light transmitting through the diffusing plate 3 or luminance distribution on the diffusing plate 3.

Figure 15:
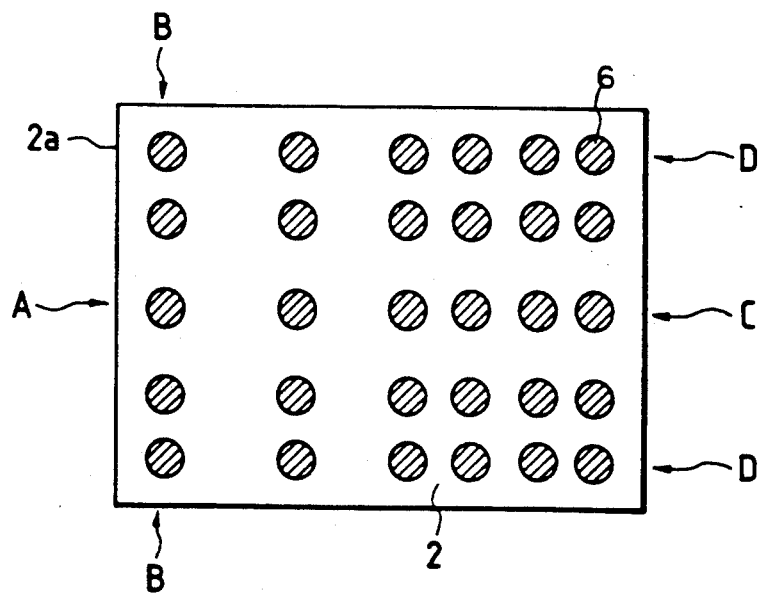

FIG. 15 illustrates patterns arranged on the rear surface of the light transmitting member in the Embodiment 5 of the present invention. In the Embodiment 5, spot-shaped patterns which have the same areas and diffusing function are arranged at a wide pitch at the portion A and at narrower pitches from the portion A toward the portion C. Accordingly, density in area of the patterns is low at the portion A and higher at the portions farther from the portion A.

The Embodiment 5 which uses the patterns arranged on the light transmitting member 2 as shown in FIG. 15 also has the effect similar to that of the Embodiment 4, thereby uniformalizing luminance distribution on the diffusing plate.

Figure 16:
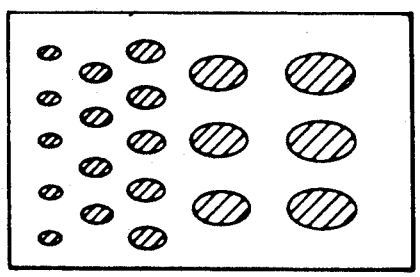
FIG. 16 and 17 illustrate the present invention where the portions having diffusing functions are formed to be elliptical.
Figure 17:
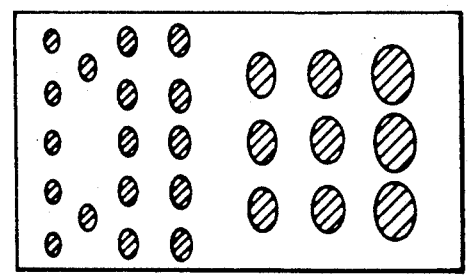

FIG. 16 illustrates an embodiment of the present invention where the patterns are formed so as to be elliptical in shape. Of course the patterns may also be oriented as shown in FIG. 17, where the ellipses have been rotated 90°.

Figure 18:
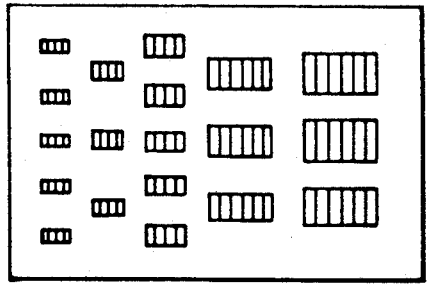
FIG. 18 and 19 depict the present invention where the portions having diffusing functions are formed to be rectangular.
Figure 19:
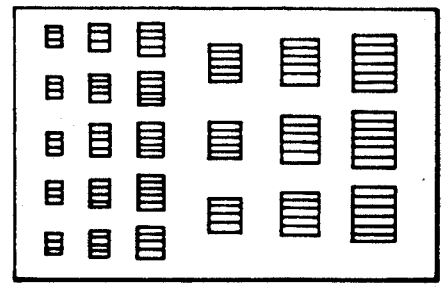

FIG. 18 depicts the situation where the patterns are formed so as to be rectangular in shape. Again, it is possible to orient the patterns 90° from what is shown in FIG. 18, thus arriving at a pattern as illustrated in FIG. 19.

I claim:
1. A surface light source device comprising:
   a linear light source,
   a light transmitting member having an end surface of incidence located proximate said light source,
   a diffusing plate disposed on a front surface of said light transmitting member, and
   a reflecting plate,
   wherein patterns formed as portions having diffusing functions are disposed on a rear surface of said light transmitting member, and
   wherein said portions having diffusing functions are sparse in area at a portion proximate a center of the end surface of incidence and said portions become progressively denser in area as the portions are farther from the center of the end surface of incidence.

2. A surface light source device according to claim 1, wherein said patterns are formed as a plurality of portions having the diffusing function and having widths that vary from narrow to wide from a side where the end surface of incidence is disposed toward a second end surface located on a side opposite the end surface of incidence as well as portions having the diffusing function and wider toward both sides thereof in the vicinity of the end surface of incidence.

3. A surface light source device comprising:
   a linear light source,
   a light transmitting member composed of a transparent material and having an end surface of incidence located proximate said light source,
   a diffusing plate disposed on a front surface of said light transmitting member,
   a reflecting plate arranged on a rear surface of said light transmitting member, and
   a second reflecting surface formed on a second end surface located on a side opposite the end surface of incidence of said light transmitting member,
   wherein patterns formed as portions having diffusing functions are disposed on the rear surface of said light transmitting member,
   wherein said patterns are formed as a multiple number of portions having diffusing functions and very small areas, and
   wherein said portions are sparse in area proximate the end surface of incidence, become progressively denser in area toward the second end surface, and are denser in area on both sides than in a middle portion proximate the end surface of incidence.

4. A surface light source device according to claim 1 wherein each of said patterns is formed as a circular portion having the diffusing function.

5. A surface light source device according to claim 1 wherein each of said patterns is formed as an elliptic portion having the diffusing function.

6. A surface light source device according to claim 1 wherein each of said patterns is formed as a rectangular portion having the diffusing function.

7. A surface light source device comprising:
   a linear light source,
   a light transmitting member having an end surface of incidence located proximate said light source,
   a diffusing plate arranged on a front surface of said light transmitting member, and
   a reflecting plate arranged on a rear surface of said light transmitting member,
   wherein patterns formed as portions having a diffusing function are arranged on the rear surface of said light transmitting member;
   said patterns consisting of a plurality of linear portions arranged at a definite pitch, having non-predetermined widths and being parallel with said light source, and
   wherein said linear portions are thin on a side of the end surface of incidence, become progressively thicker toward a second end surface located on a side opposite the end surface of incidence, and have ends thicker than middle portions thereof in proximate the end surface of incidence.

* * * * *